United States Patent [19]
Wake

[11] Patent Number: 5,838,473
[45] Date of Patent: Nov. 17, 1998

[54] OPTICAL COMMUNICATIONS SYSTEM

[75] Inventor: David Wake, Levington, United Kingdom

[73] Assignee: British Telecommunications public limited company, London, England

[21] Appl. No.: 622,345

[22] Filed: Mar. 25, 1996

[30]    Foreign Application Priority Data

Oct. 13, 1995 [GB] United Kingdom .................. 9520946
Nov. 29, 1995 [EP] European Pat. Off. ............. 95308583

[51] Int. Cl.$^6$ ............................ H04B 10/00; H04B 10/06
[52] U.S. Cl. .......................... 359/168; 359/167; 359/191
[58] Field of Search ..................................... 359/125, 137,
359/133, 145, 162, 167–168, 191, 325–326;
455/92, 118; 379/56

[56]    References Cited

U.S. PATENT DOCUMENTS 4,868,894  9/1989  Gilden et al. ............................ 359/162
5,535,044  7/1996  Takeshima et al. .................... 359/191

OTHER PUBLICATIONS

Pavlidis, D "Millimeter–Wave and Optoelectronic Applications of Heterostructure Integrated Circuits" Proceedings of the SPIE, Oct. 28. 1990.

Pavlidis "Millimeter–Wave and Optoelectronic Applications of Heterostructure Integrated Circuits", SPIE, vol. 1362, Physical Concepts of Materials for Novel Optoelectronic Device Aplications II: Device Physics and Applications (1990).

*Primary Examiner*—Kinfe-Michael Negash
*Attorney, Agent, or Firm*—Nixon & Vanderhye P.C.

[57]    ABSTRACT

An optical communication system used for the distribution of a signal includes a central station having an optical source. One or more remote stations are connected to the central station by an optical network. The central station outputs onto the network a carrier signal and an intermediate frequency signal. The remote station includes an optical mixer/detector which mixes the carrier and intermediate frequency signal both in the optical domain and outputs an RF electrical signal. The optical mixer/detector may be a heterojunction bipolar phototransistor (HBT). The optical source in the central station may be a dual-mode semiconductor laser.

14 Claims, 4 Drawing Sheets

CONFIGURATION A

CONFIGURATION B

OPTICAL COMMUNICATIONS SYSTEM

BACKGROUND OF THE INVENTION

1. Field of the Invention

The present invention relates to an optical communications system, and in particular to a system suitable for distributing signals to be transmitted at radio frequencies to mobile or cordless users.

2. Related Art

It has been proposed to use millimetre-wave radio as a short-range "final-drop" access medium for future telecom services requiring both medium to high data capacity and the use of mobile or cordless terminals by the end-user. Such a system might be used to extend services such as video telephony, or other multimedia services beyond the fixed network to mobile users. Current proposals suggest the use of radio frequencies above 30 GHz, and particularly in the region of 60 GHz in a cellular network comprising small cells having a diameter of, e.g., 100 to 200 meters.

The small size of the cell implies a need for a large number of cell transmitter sites and accordingly it is important that the cost of the cell transmitter sites, and of the associated signal distribution systems, are kept as low as possible.

Fibre-fed systems in which signals at the carrier frequency are distributed optically from a central location potentially offer significant capital cost savings in terms of infrastructure, as well as simplified management and control. There are many different ways of configuring the optical link in these systems, ranging from conventional approaches using external optical modulators and PIN photodiodes, to more exotic approaches, for example using harmonic techniques for optical carrier generation, [1]. Conventionally, data modulation of the carrier has been carried out at the source located in the central station, prior to the transmission of the signal over the optical link to a remote site in a given cell. There has also been a proposal for the use of a system in which the carrier and the modulated IF signal are transmitted separately across the optical link and mixed at the remote site, after the conversion of one or other of the signals to the electrical domain. This approach however, has resulted in a significant increase in the cost and complexity of the remote site, and so has not found commercial acceptance.

SUMMARY OF THE INVENTION

According to a first aspect of the present invention, there is provided an optical communications system for the distribution of a signal comprising a central station including an optical source, at least one remote station, and an optical network connecting the central station to the or each remote station, the central station outputting onto the optical network a carrier signal and an intermediate frequency signal, and the remote station including means for mixing signals and thereby generating an RF signal, characterised in that the means for mixing comprise an optical mixer/detector arranged to mix the carrier and intermediate frequency signals both input in the optical domain and to output an RF electrical signal.

The present inventor has realised that by carrying out the mixing of the signals at the remote site entirely input in the optical domain it is possible to combine the functions of mixer and photodetector in a single device, enabling a great saving in the cost and complexity of the remote site. At the same time, the approach adopted in the present invention is found to minimise problems with dispersion which, in prior art systems, have led to signal fading and other forms of signal degradation. The term "optical network" as used herein encompasses a simple point-to-point link, as well as more complex topologies.

Preferably the optical mixer/detector is a phototransistor, and more preferably a heterojunction bipolar phototransistor (HBT).

The use of a phototransistor is preferred as being able to provide a significant level of gain, together with the functions of mixing the signals and converting to the electrical domain. The use of an HBT is found to give a particularly good performance and can be constructed to facilitate optical access to the device. The present invention is not however limited to the use of phototransistors, and other devices may be used. For example, an avalanche photodiode (APD) may be used as the mixer/detector.

Preferably the network comprises a passive optical network (PON) linking a plurality of remote stations to the central station.

Where a PON and optical splitting are used to take signals from a single central station to a number of remote stations then the PON will in general use erbium-doped fibre amplifiers (EDFA). However, since these have a fixed wavelength of operation, at around 1550 nm, the transmission wavelength cannot then be freely chosen to minimise dispersion in the fibre. Accordingly, it is particularly advantageous in this context to be able to transmit the carrier and IF signal separately and thereby substantially eliminate problems due to dispersion.

Preferably the optical source for the carrier signal comprises a dual-mode semiconductor laser.

The use of a signal from a dual-mode semiconductor laser, as described in the paper by C. R. Lima, D. Wake and P. A. Davies, Electronics Letters, 2nd Mar. 1995, Vol 31 No. 5 pp 364–365, further optimises the dispersion performance of the system.

According to a second aspect of the present invention there is provided a remote station for use in an optical communications system, the remote station including an input for connection to an optical network, in use the remote station receiving a carrier signal and an IF signal from the optical network, and means for mixing the carrier signal and IF signal received at the input and thereby generating an RF signal, characterised in that the means for mixing comprise an optical mixer/detector arranged to mix the carrier and intermediate frequency signals both input in the optical domain and to output an RF electrical signal.

According to a third aspect of the present invention, there is provided a method of operating an optical communications system comprising a central station including an optical source, at least one remote station and an optical network connecting the central station to the or each remote station, the method including outputting from the central station onto the network a carrier signal and an intermediate frequency signal, and the remote station mixing signals at the carrier frequency and intermediate frequency and thereby generating an RF signal, characterised in that the step of mixing the signals is carried out in the optical domain in an optical mixer/detector and the resulting signal is converted by the mixer to the electrical domain and output as an RF electrical signal.

BRIEF DESCRIPTION OF THE DRAWINGS

Systems embodying the present invention will now be described in further detail, by way of example only, and contrasted with the prior art, with reference to the accompanying drawings in which.

DETAILED DESCRIPTION OF EXEMPLARY EMBODIMENTS

Figure 4:
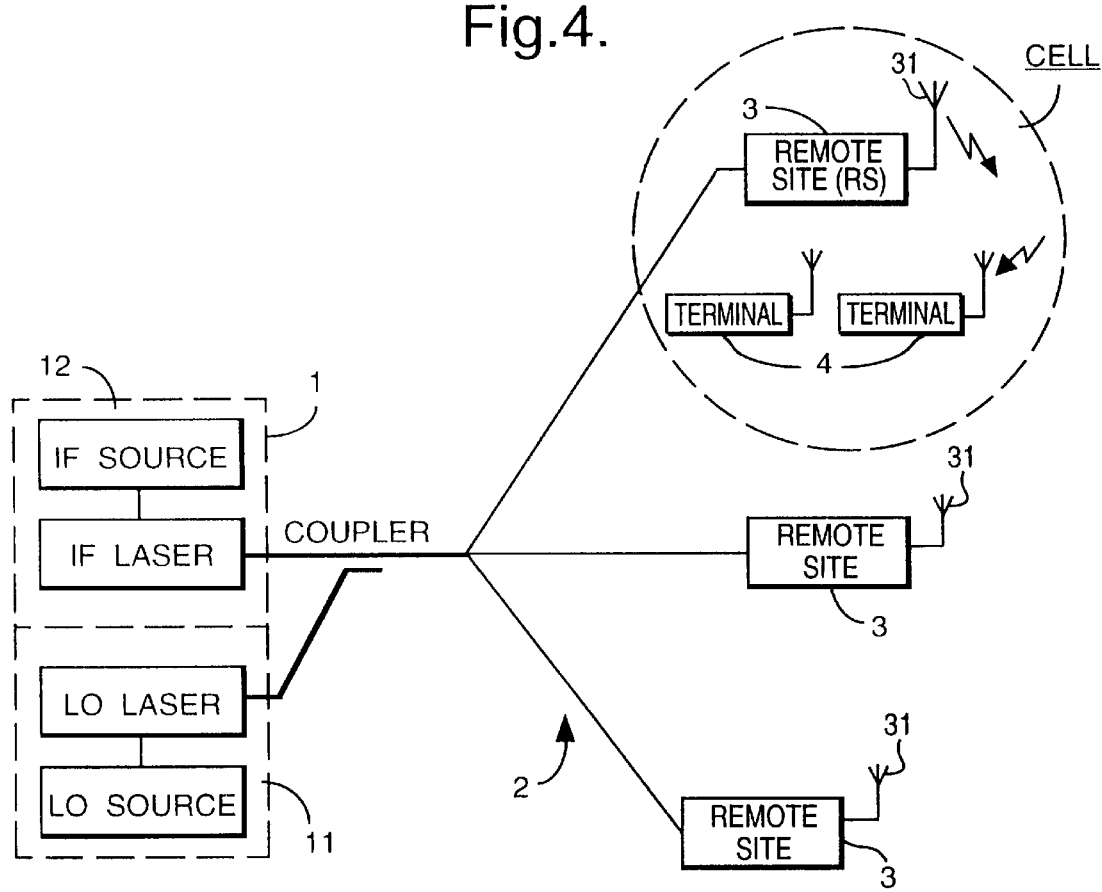
FIG. 4 is a diagram showing a system embodying the present invention and incorporating a multiple access PON.

As shown in FIG. 4, an optical communication system comprises a central station 1 linked by a fibre network 2 to a number of remote sites 3. Each remote site 3 includes an antenna 31 and transmits RF signals to mobile terminals 4 within a respective cell. In the present example, the RF signals are transmitted in the 62–63 GHz or 65–66 GHz frequency bands. The mobile terminals may include, for example, audio/video transceivers and input/output devices for use with video telephony or interactive multimedia services (IMS).

Figure 7:
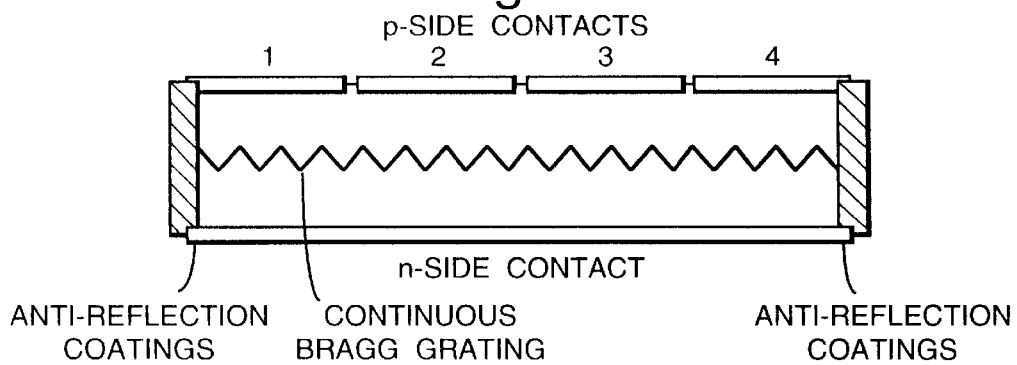
FIG. 7 shows a dual mode semiconductor laser.

The central station includes a carrier source 11 and a modulated IF source 12, the IF source being modulated with the data which is to be transmitted by the remote station to the users. For the carrier frequency source, a dual-mode semiconductor laser is used. As described in the above-cited paper by Lima, Wake and Davies, this is a specially modified DFB device in which oscillation occurs simultaneously on both sides of the Bragg frequency. The laser is shown in FIG. 7. The 2 mm–long laser has a uniform grating, operates in the region of 1560 nm and is divided into four sections of lengths 85,610,610 and 730 $\mu$m respectively. It has four electrical contacts. The sections are independently biased at 20–110 mA and modulation is applied via the shortest section in order to provide the highest current density for a given level of drive power. The optical output is taken from the laser via a lens ended fibre. The facets of the laser have anti-reflection coatings.

Figure 1A:
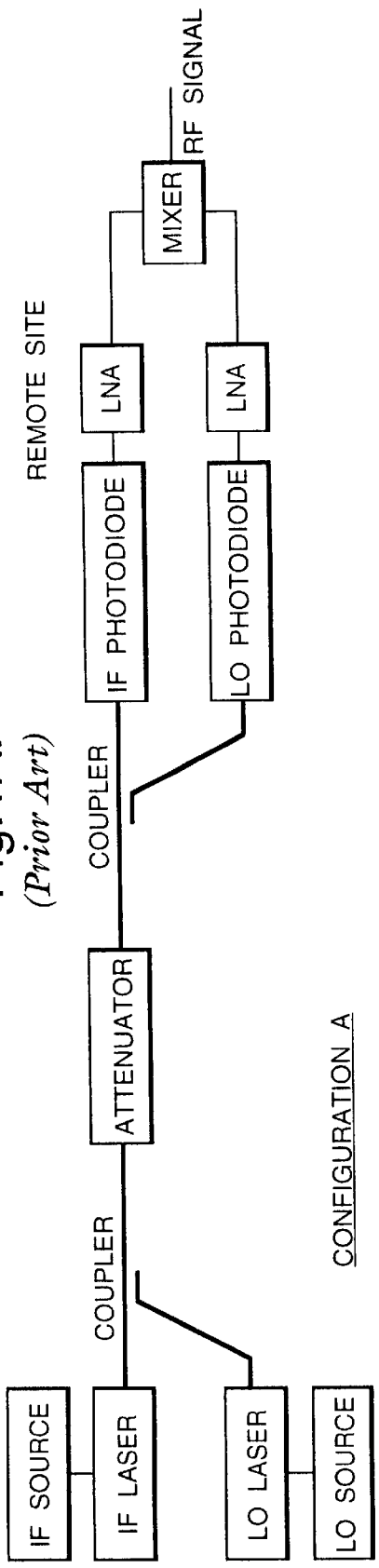
FIGS. 1A and 1B are schematics of a prior art system and a system embodying the present invention respectively.
Figure 1B:
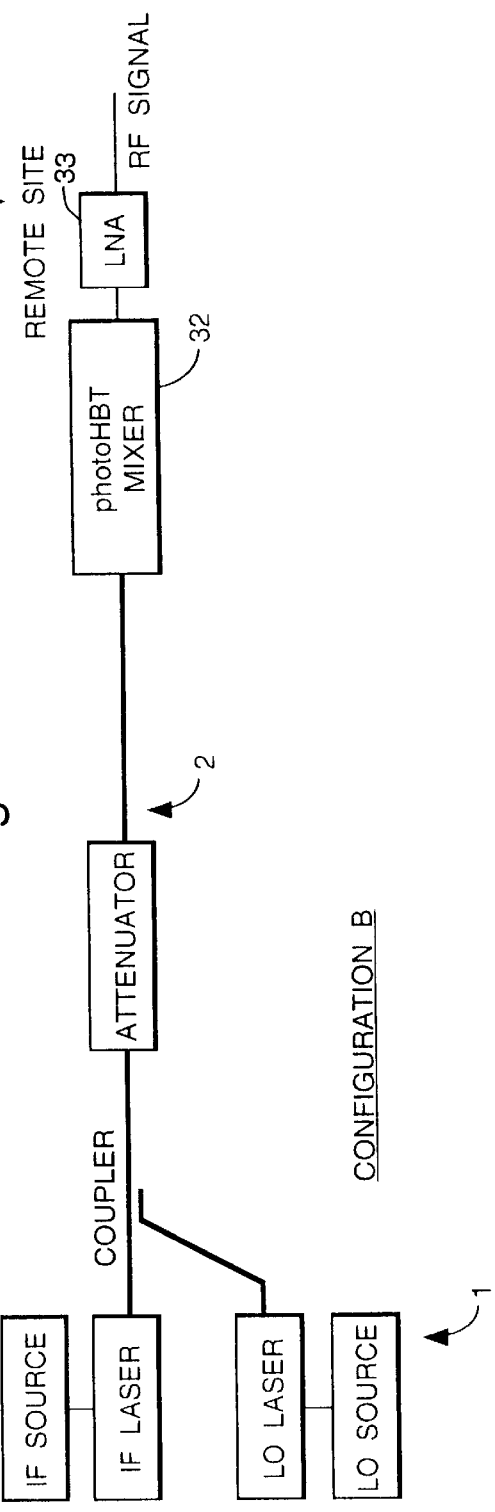
Figure 5:
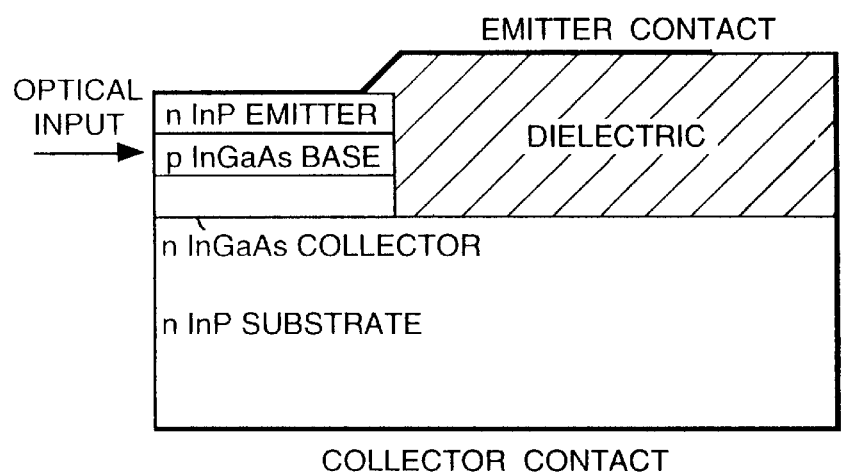
FIG. 5 is a schematic cross section of an HBT for use in systems embodying the present invention.

As shown in FIG. 1B, the remote station in this example uses a photo HBT as a combined mixer/detector. The HBT is shown in FIG. 5 and is a two-terminal, edge-coupled InGaAs/InP device developed at BT Labs and designed with low parasitics and efficient optical access [2]. The HBT has a dc responsivity of around 200 A/W.

The device and its fabrication are described in further detail in [2].

Alternative mixer/detector devices include APDs, and FET phototransistors. For example, the mixer/detector may be a Germanium or InGaAs APD's.

Figure 2:
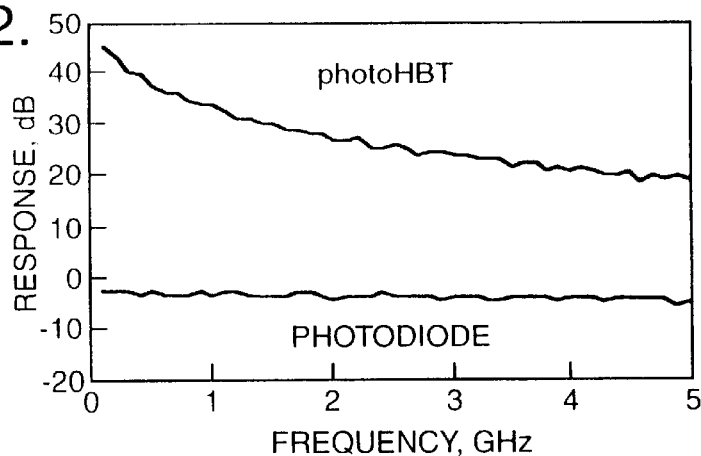
FIG. 2 is a plot of frequency of response curves for a photoHBT and a photodiode.

The technique of the present invention was verified experimentally, and compared to a more conventional approach using two photodiodes and an electrical mixer. FIG. 1 shows these configurations; A is the prior art two photodiode plus mixer approach, and B is the single phototransistor alternative. The remote end of configuration B embodying the present invention is much simpler than for A, requiring no mixer or WDM coupler, and only requiring one photodetector and one amplifier. In each configuration, the carrier (LO) and data (IF) modulate separate lasers, whose outputs are combined optically using a WDM coupler. In configuration A, the signals are separated at the remote site using another WDM coupler, and detected using photodiodes. Low noise amplifiers (LNA) are used to bring the signals to a power level required by the electrical mixer. In configuration B, the photoHBT 32 is used to detect both signals, and the internal nonlinearities are used to provide the mixing function. A low noise amplifier 33 is used to bring the signal to the same level as in configuration A. To compare these approaches, a link similar to configuration B was constructed, and measurements of signal and noise levels were performed using a spectrum analyser with a low noise preamplifier. An optical attenuator was used in place of a long span of optical fibre to reproduce the effects of losses due to fibre attenuation and potential splitting losses. A photodiode was also used in place of the photoHBT for measurements relevant to configuration A. The photodiode used was developed at BT Labs, and has a dc responsivity of 0.75 A/W and a 3 dB bandwidth of around 20 GHz [3]. The frequency response curves of these devices are shown in FIG. 2. The vertical scale in this figure shows the response in dB (electrical) referred to a responsivity of 1 A/W. The photoHBT response has a gain (compared to the photodiode) of around 45 dB at 140 MHz, and 25 dB at 4 GHz. These frequencies were used in this experiment (IF of 140 MHz and LO of 4 GHz) in order to demonstrate the concept. This technique, however, is equally applicable and particularly relevant for use at mm-wave frequencies.

Figure 3A:
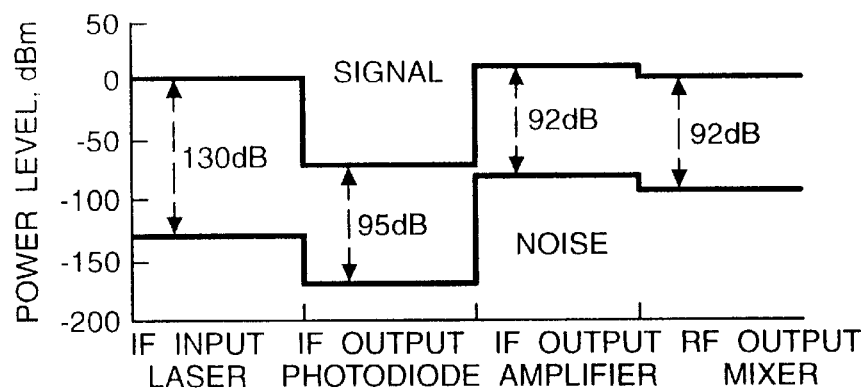
FIGS. 3A and 3B are charts showing signal and noise levels for a prior art system and for a system embodying the present invention.
Figure 3B:
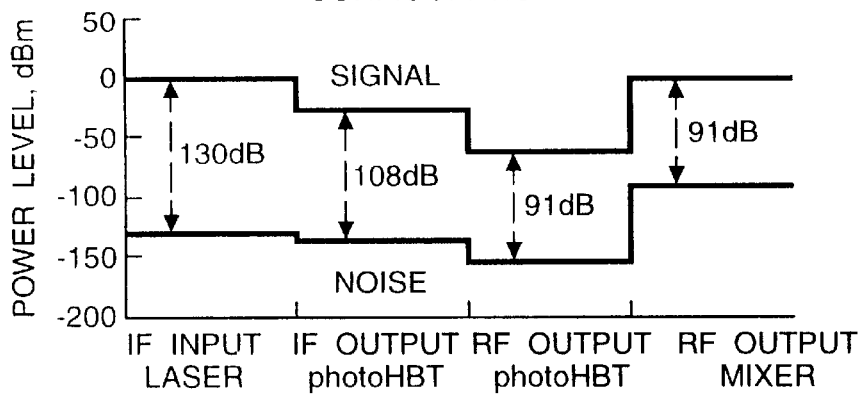

FIG. 3 shows the signal and noise levels (in 1 Hz bandwidth) obtained for each configuration as the signal passes through from IF at the source to RF at the remote site. These levels were obtained from measurement of the experimental optical link and adjusted downstream for typical amplifier and mixer performance. The noise level at the photodiode for configuration A was too low to measure, and was assumed to be negligible compared to the noise generated by the LNA (since the photocurrent was only 7.5 $\mu$A). The noise at the source was dominated by phase noise, and the level at 1 MHz offset from the carrier was used (−130 dBm). An RF signal level of 0dBm was chosen as the final output power. At each position in the link, the signal to noise ratio is also shown in the figure. For the photodiode configuration (A), the signal level drops by 73 dB across the optical link, and 83 dB of amplification must be used to provide sufficient output power if a mixer gain of −10 dB is assumed. A S/N ratio of 92 dB is obtained; most of the degradation being due to the optical link. For the photoHBT configuration (B), the signal level drops by only 28 dB due to the high internal gain of the device. However, this gain is also accompanied by higher noise (−135 dBm) which limits the S/N ratio to only 13 dB more than in the case of the photodiode. After the internal mixing process the S/N ratio becomes almost identical that of the photodiode configuration, but only 65 dB of amplification is required (compared to 83 dB for configuration A).

Figure 6A:
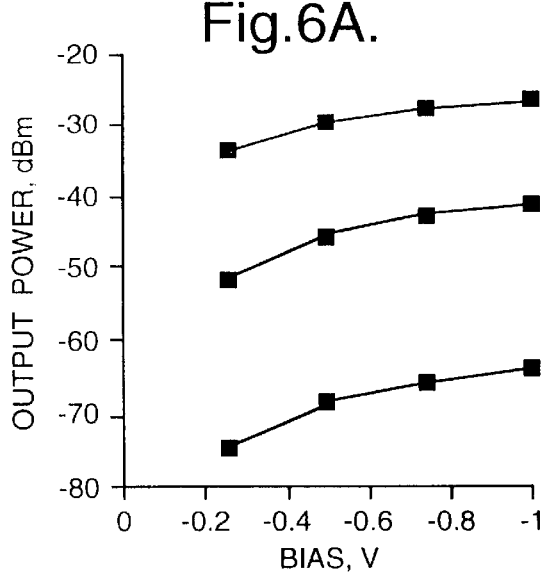
FIGS. 6A and 6B are graphs illustrating the relative performance at a photoHBT and a photodiode.
Figure 6B:
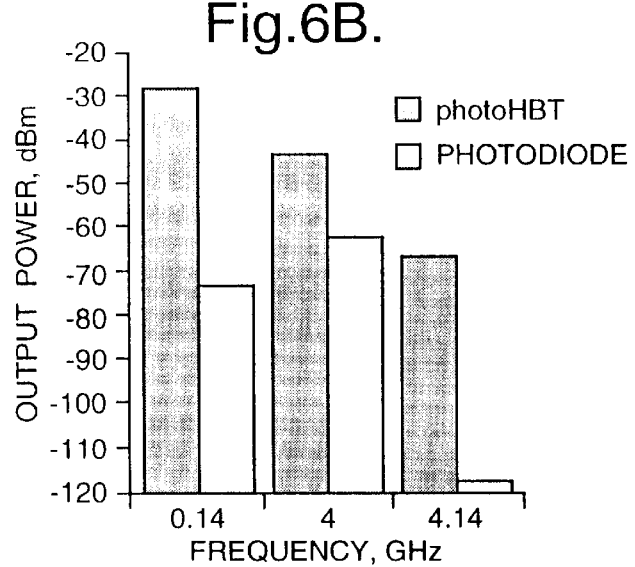

The table below lists the output powers obtained for the IF signal, the carrier signal (LO) and the RF signal at different bias currents and voltages. In the table, Iph is the photocurrent. These results are further illustrated in the graphs of FIGS. 6A and 6B. Although for experimental convenience, a relatively low radio frequency of 4 GHz is used, in commercial implementations the higher frequencies of around 60 GHz referred to above would be used.

REFERENCES

1. D. Wake, I. C. Smith, N. G. Walker, I. D. Henning, and R. D. Carver, 'Video transmission over a 40 GHz radio-fibre link', Electron. Lett., vol. 28, pp. 2024–2025, 1992.

2. D. Wake, D. J. Newson, M. J. Harlow, and I. D. Henning, 'Optically-biased edge-coupled InP/InGaAs heterojunction phototransistors', Electron. Lett., vol. 29, pp. 2217–2219, 1993.
3. D. Wake, R. H. Walling, I. D. Henning, and D. G. Parker, 'Planar junction, top-illuminated GaAs/InP pin photodiode with bandwidth of 25 GHz', Electron. Lett., vol. 25, pp. 967–968, 1989.

TABLE

PERFORMANCE DATA

HPT mixing expts 5                                                                  18-5/95

Set-up:
| | LO LASER | | ATTN | OUT | S Analyser | |
|---|---|---|---|---|---|---|
| | IF LASER | | | | | |
| LO Laser | | S/N 00811 | I1 = 90 mA | I2 = 22 mA | f = 4GHz | P = 14 dBm |
| IF Laser | | S/N 00637 | I1 = 80 mA | I2 = 22 mA | f = 140MHz | P = 15 dBm |
| LO Osc. | | 83620A | | | | |
| IF Osc. | | 8341B | | | | |
| Sp. Analyser | | HP71000 | | | | |
| DUT | HPT | #33723 (AR1099 2) | | | | |
| | HSP | 1628/2 | | | | |

| Device | Attn. dB | iph, mA | Bias, V | P, dBm | IF | LO | RF |
|---|---|---|---|---|---|---|---|
| | | | | | 0.14 | 4 | 4.14 |
| HSP | 0 | 0.52 | −5 | | −36.3 | −26.4 | −81.3 |
| | 15 | 0.016 | −5 | | −67.2 | −55.8 | −111.3 |
| | 18 | 0.008 | −5 | | −73.2 | −61.8 | −117.3 |
| HPT | 18 | 0.67 | −0.25 | | −34.5 | −52.5 | −75 |
| | | 1 | −0.5 | | −30.2 | −46.3 | −88.8 |
| | | 1.3 | −0.75 | | −28.5 | −43.4 | −66.5 |
| | | 1.6 | −1 | | −27.9 | −42.3 | −64.9 |

I claim:

1. An optical communications system for the distribution of a signal, said system comprising:
   a central station including an optical source and arranged to output carrier frequency and intermediate frequency signals modulated on respective optical carriers:
   an optical signal distribution network;
   at least one remote station connected to the central station by the optical network, the at least one remote station including an integral mixer/detector arranged to receive at an input the carrier frequency and intermediate frequency signals in the optical domain and to output an electrical RF signal produced by the mixing of the carrier and intermediate frequency signals.

2. A system as in claim 1 in which the integral mixer/detector is a phototransistor.

3. A system as in claim 2 in which the integral mixer/detector is a heterojunction bipolar phototransistor (HBT).

4. A system as in claim 1 in which the optical network comprises a passive optical network (PON) which links a plurality of remote stations to the central station.

5. A system as in claim 1 in which an optical source for the carrier signal comprises a dual-mode semiconductor laser.

6. A system as in claim 1 comprising part of a cellular mobile radio system.

7. A remote station for use in an optical communications system, said station comprising:
   a) an optical input for connection to an optical network;
   b) an electrical output for outputting an RF signal; and
   c) an integral mixer/detector arranged to receive from the optical input carrier frequency and intermediate frequency signals in the optical domain and to supply to the electrical output an electrical RF signal produced by the mixing of the carrier and intermediate frequency signals.

8. A remote station as in claim 7 in which the integral mixer/detector is a phototransistor.

9. A method of operating an optical communications system comprising a central station including an optical source, at least one remote station, and an optical network connecting the central station with each remote station, the method comprising:
   (a) outputting from the central station onto the network a carrier frequency optical signal and intermediate frequency signal both modulated onto respective optical carriers; and
   (b) at the remote station feeding both the said carrier and intermediate frequency signals in the optical domain to an integral mixer/detector and outputting from the integral mixer/detector an RF electrical signal corresponding to the mixing product of the intermediate and carrier frequency signals.

10. A method as in claim 9 in which in step (b) the signals in the optical domain are fed to the optical input of a phototransistor.

11. A method as in claim 10 in which the phototransistor is a heterojunction bipolar transistor (HBT).

12. An optical communications system for the distribution of a signal, said system comprising:
   a central station including an optical source and arranged to output carrier frequency and intermediate frequency signals modulated on respective optical carriers;
   an optical signal distribution network; and
   a multiplicity of remote stations connected to the central station by the optical network,
   each remote station including an integral mixer/detector comprising a phototransistor arranged to receive at an input the carrier frequency and intermediate frequency signals in the optical domain and to output an electrical RF signal produced by the mixing of the carrier and intermediate frequency signals.

13. An optical communications system as in claim 12 comprising part of a cellular mobile radio system.

14. A hybrid optical-optical/electrical domain method of mixing LO and IF optical signals to produce an RF electrical output signal in an optical communication system, said method comprising the steps of:

using one integral optical-to-electrical signal transducer with an included non-linear response characteristic to process two input optical LO and IF signals and to therein produce corresponding LO and IF signals; and further mixing said LO and IF signals within said one integral optical-to-electrical signal transducer to recover and output a modulated Rf electrical signal therefrom.

* * * * *